3,267,110
TRIFLUOROMETHYL SUBSTITUTED o-AMINOPHENYL KETONES

Irwin J. Pachter, Woodbury, N.Y., and James W. Wilson, Wayne, Pa., assignors to Smith Kline & French Laboratories, Philadelphia, Pa., a corporation of Pennsylvania
No Drawing. Original application June 3, 1960, Ser. No. 33,620. Divided and this application Dec. 3, 1963, Ser. No. 327,829
1 Claim. (Cl. 260—296)

This application is a division of Serial No. 33,620, filed June 3, 1960.

This invention relates to a process for preparing trifluoromethyl substituted o-aminophenyl ketones and the novel o-aminophenyl ketones prepared thereby.

The trifluoromethyl substituted o-aminophenyl ketones of this invention are useful as intermediates in the preparation of trifluoromethyl-1,4-benzodiazepine derivatives which have valuable pharmacodynamic activity, particularly as ataractics, antidepressants, tranquilizers, anticonvulsants and muscle relaxants.

The process of this invention for the preparation of trifluoromethyl substituted o-aminophenyl ketones is schematically represented as follows:

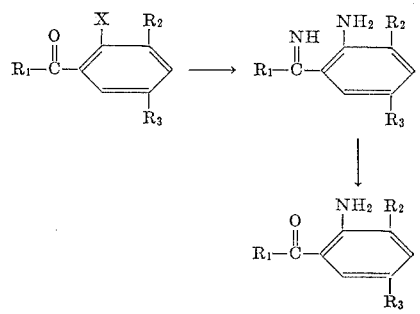

Formula I when:

$R_1$ represents phenyl, substituted phenyl such as halophenyl, trifluoromethylphenyl, lower alkoxyphenyl, or lower alkylphenyl, lower alkyl, cycloalky having 3 to 6 carbon atoms such as cyclohexyl or cyclopentyl, aralkyl having 7 to 8 carbon atoms such as benzyl or phenethyl, or an aromatic nitrogen, oxygen or sulfur containing heterocycle such as thienyl, pyrrolyl, pyridyl, furyl or indolyl;

$R_2$ and $R_3$ represent hydrogen or trifluoromethyl, at least one of said members being trifluoromethyl; and X represents halogen such as fluorine or iodine and preferably chlorine or bromine.

The terms "lower alkyl" and "lower alkoxy" are used herein alone or in combination with other terms to denote residues derived from an aliphatic hydrocarbon group having a maximum of 6 carbon atoms, preferably methyl or ethyl.

The novel o-aminophenyl ketones of this invention are represented by Formula I.

Also included in this invention are the nontoxic pharmaceutically acceptable salts of the o-aminophenyl ketones of this invention. These salts are prepared by reacting the base with either an equimolar amount or an excess of an organic or inorganic acid in an anhydrous solvent such as benzene, chloroform or ether with the desired salt separating directly. In addition, these salts may be prepared in an aqueous solvent such as aqueous alcohol, for example methanol or ethanol, with isolation of the salt by concentration and cooling. Exemplary of such inorganic salts are those with hydrochloric and hydrobromic acids. Exemplary of such organic salts are those with methanesulfonic, ethanedisulfonic, and benzene sulfonic acids.

According to the method of this invention a trifluoromethyl-o-halophenyl ketone is treated with ammonia at elevated temperatures such as about 135–170° C., preferably about 140–150° C. for a reaction period of about 6–15 hours. This reaction is conveniently carried out in a pressure vessel. Removing the ammonia in vacuo gives the trifluoromethyl-o-aminophenyl ketone imine intermediate which is hydrolyzed by heating at about 80–100° C. with a dilute mineral acid such as hydrochloric acid or sulfuric acid for a period of about 5–90 minutes to give the trifluoromethyl-o-aminophenyl ketone products of Formula I.

The trifluoromethyl-o-halophenyl ketone starting materials for the process of this invention are prepared by condensing a trifluoromethyl-o-halobenzonitrile with a Grignard reagent, $R_1MgX_1$, in an ethereal solution such as diethyl ether or tetrahydrofuran to give, after hydrolytic decomposition with dilute mineral acid such as with hydrochloric or sulfuric acid, the salt of trifluoromethyl-o-halophenyl ketone imine. The free base is generated by neutralizing an aqueous solution of the salt with a basic reagent such as ammonia or an alkali metal carbonate such as for example sodium or potassium carbonate.

Hydrolysis of the trifluoromethyl-o-halophenyl ketone imine salt intermediate is accomplished by heating in water or in dilute hydrochloric acid, conveniently at reflux temperature, for about 5–90 minutes to give the trifluoromethyl-o-halophenyl ketone.

The trifluoromethyl-o-halobenzonitrile starting materials are either known to the art or may be prepared by diazotization of an o-haloaniline and treatment of the diazonium salt with cuprous cyanide.

The novel trifluoromethyl substituted o-aminophenyl ketones of this invention are useful as intermediates for preparing pharmacodynamically active 1,4-benzodiazepines by the following procedure:

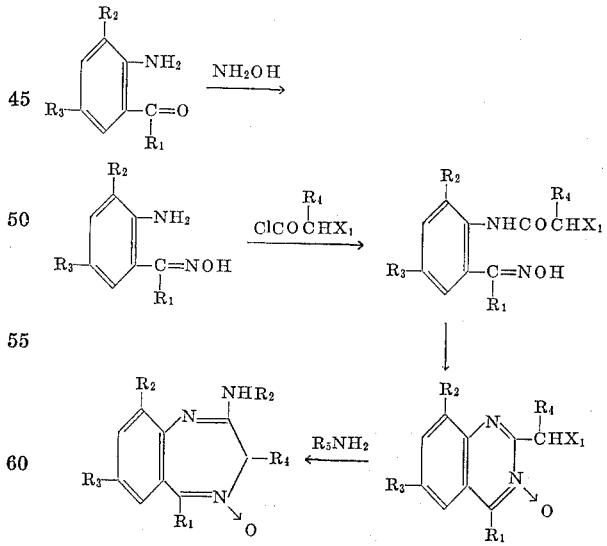

The terms $R_1$, $R_2$, $R_3$ are as previously defined; $X_1$ is a reactive halogen, $R_4$ is hydrogen or lower alkyl and $R_1$ is hydrogen, lower alkyl, lower alkenyl, hydroxy-lower alkyl, lower alkoxy-lower alkyl, benzyl or phenethyl.

According to the above procedure a trifluoromethyl substituted o-aminophenyl ketone is treated with hydroxylamine in a lower alcohol solvent such as methanol or ethanol preferably in the presence of an organic base such as pyridine or lutidine to give the corresponding oxime. Acylating this oxime by treating with a α-haloacyl chloride in the presence of an acid binding agent such as sodium or potassium hydroxide gives a trifluoromethyl substituted o-(α-haloacylamino)phenyl ketone, oxime which is cyclized by treating with an acid dehydrating agent such as hydrogen chloride or sulfuric acid. Alternatively, the oxime is acylated and cyclized in one step by carrying out the reaction in acetic acid solution without an acid binding agent. The resulting quinazoline is treated with ammonia or a primary amine at 25–35° C. to give the therapeutically useful trifluoromethyl-2-amino-3H-1,4-benzodiazepine 4-oxides.

The following examples are not limiting but are illustrative of the method and compounds in accordance with this invention.

Example 1

To a cuprous cyanide solution prepared from 125 g. of cupric sulfate is added in 200 ml. of toluene the diazonium salt prepared from 48 g. of 2-bromo-5-trifluoromethylaniline. The cyanide solution is kept alkaline by addition of solid sodium carbonate during the addition of the diazonium salt at 0–5° C. The mixture is stirred for three hours, then allowed to stand for 16 hours. The toluene layer is subjected to steam distillation. The toluene is distilled off, followed by 2-bromo-5-trifluoromethylbenzonitrile, which is recrystallized from hexane to give colorless crystals, M.P. 50–51° C.

A Grignard solution prepared from 1.1 g. of magnesium, 7 g. of bromobenzene and 100 ml. of ether is added to an ethereal solution of 7.5 g. of 2-bromo-5-trifluoromethylbenzonitrile. The mixture is stirred for two hours, then is poured into excess cold dilute hydrochloric acid. The solid hydrochloride salt of 2-bromo-5-trifluoromethylbenzophenone imine separates. Treating this salt with ammonia gives the oily free base. The hydrochloride salt, M.P. 296° C. (dec.), is regenerated by treating the free base with dilute hydrochloric acid.

Upon heating the imine salt for one hour with boiling water, 2-bromo-5-trifluoromethylbenzophenone is obtained.

A sample of 2.5 g. of 2-bromo-5-trifluoromethylbenzophenone is heated with 25 ml. of liquid ammonia in a pressure vessel at 140° C. for eight hours. The ammonia is removed and the residue is treated with cold dilute hydrochloric acid. Basification of this solution yields 2-amino-5-trifluoromethylbenzophenone imine which is recrystallized from cyclohexane to give pale yellow needles, M.P. 144–145.5° C.

This imine is dissolved in a slight excess of dilute hydrochloric acid. Upon heating an oil separates which solidifies and is recrystallized from hexane to give 2-amino-5-trifluoromethylbenzophenone, M.P. 80–81° C.

A mixture of 26.5 g. of 2-amino-5-trifluoromethylbenzophenone, 27.0 g. of hydroxylamine hydrochloride, 150 ml. of ethanol and 50 ml. of pyridine is refluxed for 18 hours, then concentrated in vacuo. The residue is treated with water and extracted with ether. The ether solution is washed with water and diluted with petroleum ether. After standing overnight the crystals are filtered off and recrystallized from ethanol to give 2-amino-5-trifluoromethylbenzophenone oxime.

Chloroacetyl chloride (11.2 g.) is added alternately with 4.0 g. of sodium hydroxide to a solution of 25.0 g. of 2-amino-5-trifluoromethylbenzophenone oxime in 175 ml. of dioxane. The mixture is left at room temperature for 30 minutes, then acidified with hydrochloric acid and diluted with water and ether. The ether layer is separated, dried and concentrated to give, as the residue, 2-chloroacetamido-5-trifluoromethylbenzophenone oxime. To this product is added 200 ml. of acetic acid and the resulting mixture is saturated with hydrogen chloride. After 12 hours at 40–50° C., the mixture is concentrated in vacuo to give 2-chloromethyl-4-phenyl-6-trifluoromethylquinazoline 3-oxide.

Twenty grams of 2-chloromethyl-4-phenyl-6-trifluoromethylquinazoline 3-oxide and 150 ml. of ice cold 30% methanolic methylamine are mixed and allowed to stand at room temperature for 16 hours. The crystalline product is filtered off and recrystallized from ethanol to give 2-methylamino-5-phenyl-7-trifluoromethyl-3H-1,4-benzodiazepine 4-oxide.

Example 2

An ether solution of 4.7 g. of p-methoxyphenylmagnesium bromide is added with stirring to 3.7 g. of 2-bromo-5-trifluoromethylbenzonitrile. The resulting mixture is stirred for two hours, then poured into cold dilute hydrochloric acid. The yellow hydrochloride salt of 2-bromo-4'-methoxy-5-trifluoromethylbenzophenone imine, M.P. 242° C. (dec.), is separated.

Upon heating the imine salt with boiling water for 90 minutes, 2-bromo-4'-methoxy-5-trifluoromethylbenzophenone is obtained.

A mixture of 4.0 g. of 2-bromo-4'-methoxy-5-trifluoromethylbenzophenone and 40 ml. of liquid ammonia is heated at 145° C. for seven hours. The excess ammonia is removed. The residue is dissolved in cold dilute hydrochloric acid. Upon basification 2-amino-4'-methoxy-5-trifluoromethylbenzophenone imine is obtained.

The imine prepared above is heated with an excess of dilute hydrochloric acid at 80° C. for one hour to give 2-amino-4'-methoxy-5-trifluoromethylbenzophenone which, upon recrystallization from hexane, melts at 92–93° C.

Substituting m-butoxyphenylmagnesium iodide in the above reaction gives the 3-butoxy analogues.

Example 3

Nitration of 2,4-ditrifluoromethylchlorobenzene as in Example 10 gives 6-nitro-2,4-ditrifluoromethylchlorobenzene. The nitro group is reduced by catalytic hydrogenation to give 2-chloro-3,5-ditrifluoromethylaniline. The diazonium salt of this aniline is reacted with cuprous cyanide as in Example 1 to give 2-chloro-3,5-ditrifluoromethylbenzonitrile.

An ether solution of 8.1 g. of phenylmagnesium bromide and 9.5 g. of 2-chloro-3,5-ditrifluoromethylbenzonitrile is stirred for two hours, then poured into cold dilute hydrochloric acid to give the hydrochloride of 2-chloro-3,5-ditrifluoromethylbenzophenone imine. Heating this imine for one hour in water gives 2-chloro-3,5-ditrifluoromethylbenzophenone.

A mixture of 4.5 g. of the above prepared benzophenone and 45 ml. of liquid ammonia are heated at 145° C. for seven hours. Working up as in Example 2 gives 2-amino-3,5-ditrifluoromethylbenzophenone imine.

When the above prepared imine is heated with dilute hydrochloric acid at 90° C. for one hour, 2-amino-3,5-ditrifluoromethylbenzophenone is obtained.

Example 4

Ethylmagnesium bromide (12.0 g.) in ether solution is treated with 15.0 g. of 2-bromo-5-trifluoromethylbenzonitrile. After stirring for two hours, the mixture is poured into cold dilute hydrochloric acid to separate the hydrochloride of 2-bromo-5-trifluoromethylpropiophenone imine. This imine salt is heated in water to give 2-bromo-5-trifluoromethylpropiophenone.

A mixture of 3.0 g. of 2-bromo-5-trifluoromethylpropiophenone and 30 ml. of liquid ammonia is heated at 140° C. for eight hours to give, after removal of the ammonia, 2-amino-5-trifluoromethylpropiophenone imine.

Heating this imine in dilute hydrochloric acid separates 2-amino-5-trifluoromethylpropiophenone.

This aminopropiophenone is refluxed with hydroxylamine hydrochloride, pyridine and ethanol to give the corresponding oxime.

Chloroacetyl chloride (6.0 g.) is added to 10.0 g. of 2-amino-5-trifluoromethylpropriophenone oxime and 100 ml. of acetic acid at 60° C. The resulting mixture is allowed to stand at room temperature for 24 hours, then filtered to give 2-chloromethyl-4-ethyl-6-trifluoromethylquinazoline 3-oxide.

Ten grams of this quinazoline is mixed with 75 ml. of cold 30% methanolic methylamine. After standing at room temperature for 16 hours, the mixture is filtered to give 5-ethyl-2-methylamino - 7 - trifluoromethyl-3H-1,4-benzodiazepine 4-oxide.

Substituting hexylmagnesium iodide or methylmagnesium iodide gives the hexyl and methyl isomers.

*Example 5*

An ether solution of 5.2 g. of cyclohexylmagnesium iodide and 3.7 g. of 2-bromo-5-trifluoromethylbenzonitrile is stirred for two hours, then is poured into cold hydrochloric acid to separate the hydrochloride of 2-bromo-5-trifluoromethylphenyl cyclohexyl ketone imine. This imine is hydrolyzed by heating in boiling water to give 2-bromo-5-trifluoromethyl cyclohexyl ketone.

The above prepared ketone (4.2 g.) is heated with 40 ml. of liquid ammonia at 140° C. for nine hours to give, after removing the excess ammonia, dissolving the residue in hydrochloric acid and then basifying, 2-amino-5-trifluoromethylphenyl cyclohexyl ketone imine.

After heating this imine with dilute hydrochloric acid at 100° C. for two hours, 2-amino - 5 - trifluoromethylphenyl cyclohexyl ketone is obtained.

This amino compound is converted to the corresponding oxime by refluxing with hydroxylamine hydrochloride, pyridine and ethanol.

To a warm solution of the above prepared oxime (14.3 g.) in 150 ml. of glacial acetic acid is added 10.0 g. of chloroacetyl chloride. Working up as in Example 4 gives 2-chloromethyl-4-cyclohexyl - 6 - trifluoromethylquinazoline 3-oxide.

A sample of 8.0 g. of the above prepared quinazoline is stirred with excess ethanolic ammonia for six hours at 25° C. The precipitate is 2-amino-5-cyclohexyl - 7 - trifluoromethyl-3H-1,4-benzodiazepine 4-oxide.

Substituting a molar equivalent amount of cyclopentylmagnesium chloride for the cyclohexylmagnesium iodide in the procedure above gives the cyclopentyl analogue.

*Example 6*

An ether solution of benzylmagnesium bromide is reacted with 2-bromo - 5 - trifluoromethylbenzonitrile as in Example 5 to give the hydrochloride salt of benzyl 2-bromo-5-trifluoromethylphenyl ketone imine.

Heating this amine salt in water furnishes benzyl 2-bromo-5-trifluoromethylphenyl ketone.

A mixture of 3.5 g. of the above prepared ketone and 35 ml. of liquid ammonia is heated at 135° C. for ten hours to give, after working up as in Example 5, 2-amino - 5 - trifluoromethylphenyl benzyl ketone imine. This imine is heated with dilute hydrochloric acid to separate 2-amino-5-trifluoromethylphenyl benzyl ketone.

A mixture of 14.0 g. of the above prepared ketone, 13.0 g. of hydroxylamine hydrochloride, 75 ml. of ethanol and 25 ml. of pyridine is refluxed for 16 hours. Working up as in Example 1 gives the oxime of 2-amino-5-trifluoromethylphenyl benzyl ketone.

This oxime in 100 ml. of acetic acid is treated with 6.0 g. of chloroacetyl chloride at room temperature for 14 hours. Concentrating the reaction mixture and recrystallizing the residue from benzene gives 2-chloromethyl-4-benzyl-6-trifluoromethylquinazoline 3-oxide.

A mixture of 10.0 g. of this quinazoline is treated with excess 30% methanolic methylamine at room temperature for 12 hours. Filtration gives 5-benzyl-2-methylamino-7-trifluoromethyl-3H-1,4-benzodiazepine 4 - oxide.

*Example 7*

2-thienylmagnesium bromide (8.4 g.) and 7.5 g. of 2-chloro - 5 - trifluoromethylbenzonitrile are stirred in ether solution for two hours. The reaction mixture is poured into dilute hydrochloric acid to separate the hydrochloride salt of 2-chloro - 5 - trifluoromethylphenyl 2-thienyl ketone imine.

The above prepared imine salt is treated with boiling water to give 2-chloro-5-trifluoromethylphenyl 2-thienyl ketone.

A mixture of 5.0 g. of the above prepared ketone is heated with 50 ml. of ammonia at 140° C. for eight hours. The excess ammonia is removed and the residue is dissolved in cold hydrochloric acid, then basified to yield 2-amino-5-trifluoromethylphenyl 2-thienyl ketone imine which is hydrolyzed by heating with dilute hydrochloric acid to give 2-amino-5-trifluoromethylphenyl 2-thienyl ketone.

This ketone is converted to its oxime by refluxing with hydroxylamine hydrochloride, pyridine and ethanol.

A mixture of 15.0 g. of 2-amino-5-trifluoromethylphenyl 2-thienyl ketone oxime, 6.0 g. of chloroacetyl chloride and 75 ml. of acetic acid is allowed to stand at room temperature for 16 hours to give 2-chloromethyl-4-(2-thienyl)-6-trifluoromethylquinazoline 3-oxide.

This quinazoline is treated with excess methylamine in methanol to give 2-methylamino-5-thienyl - 7 - trifluoromethyl-3H-1,4-benzodiazepine 4-oxide.

Substituting 3-thienylmagnesium bromide for the 2-isomer above gives the corresponding ketone and benzodiazepine oxide congeners.

*Example 8*

A mixture of 11.2 g. of p-trifluoromethylphenylmagnesium bromide and 7.5 g. of 2-bromo-5-trifluoromethylbenzonitrile in ether solution is stirred for two hours, then poured into hydrochloric acid to give the hydrochloride salt of 2-bromo - 4',5 - ditrifluoromethylbenzophenone imine.

This imine salt is heated for one hour with boiling water to give 2 - bromo - 4',5 - ditrifluoromethylbenzophenone.

A 4.0 g. sample of the above prepared bromo compound is treated at 150° C. for six hours with 40 ml. of ammonia to give, after working up as in Example 7, 2-amino - 4',5 - ditrifluoromethylbenzophenone imine.

This imine is heated with dilute hydrochloric acid at 90–100° C. for one hour to separate 2 - amino - 4',5-ditrifluoromethylbenzophenone.

*Example 9*

An ether solution of o-tolylmagnesium bromide and 2-bromo - 5 - trifluoromethylbenzonitrile is stirred for two hours. The reaction mixture is poured into cold dilute hydrochloric acid. The precipitate is 2 - bromo - 2'-methyl - 5 - trifluoromethylbenzophenone imine. This imine salt is heated with boiling water to give 2 - bromo-2' - methyl - 5 - trifluoromethylbenzophenone.

A mixture of 2.5 g. of 2 - bromo - 2' - methyl - 5-trifluoromethylbenzophenone and 25 ml. of liquid ammonia is heated at 140° C. for nine hours to give 2-amino-2' - methyl - 5 - trifluoromethylbenzophenone imine.

The above prepared imine is heated with dilute hydrochloric acid at 95° C. for 90 minutes to separate 2-amino-2' - methyl - 5 - trifluoromethylbenzophenone.

Substituting p-ethylphenylmagnesium iodide for o-tolylmagnesium bromide in equivalent amounts as above gives the corresponding 4 - ethyl congeners.

*Example 10*

A mixture of 15.0 g. of 2 - bromobenzotrifluoride and 30 ml. of fuming nitric acid in acetic anhydride is kept at 0° C. for 16 hours. Concentration of the mixture and fractional distillation of the residue gives 2 - bromo - 3 - nitrobenzotrifluoride. Reduction of the nitro group by hydrogenation in ethanol using platinum oxide gives 2-bromo - 3 - trifluoromethylaniline.

Treating a diazonium salt of 2 - bromo - 3 - trifluoromethylaniline with cuprous cyanide as in Example 1 gives 2 - bromo - 3 - trifluoromethylbenzonitrile.

An ether solution of 8.1 g. of phenylmagnesium bromide is added to 7.5 g. of 2 - bromo - 3 - trifluoromethylbenzonitrile in 100 ml. of ether. After stirring for two hours, the mixture is poured into cold dilute hydrochloric acid to separate the hydrochloride salt of 2 - bromo - 3-trifluoromethylbenzophenone imine. Upon heating this imine salt for one hour with boiling water, 2 - bromo - 3-trifluoromethylbenzophenone is obtained.

A mixture of 5.0 g. of 2 - bromo - 3 - trifluoromethylbenzophenone and 50 ml. of liquid ammonia is heated in a pressure vessel at 140° C. for 10 hours. Removing of the ammonia, dissolving the residue in cold dilute hydrochloric acid, then basifying gives 2 - amino - 3 - trifluoromethylbenzophenone imine which is heated with dilute hydrochloric acid at 90–100° C. to separate 2-amino-3-trifluoromethylbenzophenone.

*Example 11*

A mixture of 8.9 g. of m - fluorophenylmagnesium bromide and 7.5 g. of 2 - bromo - 5 - trifluoromethylbenzonitrile in 100 ml. of ether is stirred for two hours. Upon pouring into cold dilute hydrochloric acid the hydrochloride salt of 2 - bromo - 3' - fluoro - 5 - trifluoromethylbenzophenone imine is separated. Heating this imine salt with boiling water for one hour gives 2 - bromo - 3' - fluoro - 5 - trifluoromethylbenzophenone.

This bromobenzophenone (3.2 g.) is heated with 30 ml. of liquid ammonia at 145° C. for six hours to give, after working up as in Example 2, 2 - amino - 3' - fluoro - 5 - trifluoromethylbenzophenone imine. Hydrolysis of this imine by heating with dilute hydrochloric acid at 90° C. for one hour gives 2 - amino - 3' - fluoro - 5 - trifluoromethylbenzophenone.

This benzophenone is converted to the corresponding oxime and cyclized by treating with chloroacetyl chloride and acetic acid to give 2 - chloromethyl - 4 - (3-fluorophenyl) - 6 - trifluoromethylquinazoline 3 - oxide.

This quinazoline (7.0 g.) in dioxane solution is treated with 10 g. of 2 - methoxyethylamine at room temperature for 48 hours. The mixture is concentrated in vacuo. The residue is dissolved in cold hydrochloric acid, washed with ether, basified with sodium hydroxide and extracted with ether. The extracts are concentrated and the residue recrystallized from methanol to give 5 - (3 - fluorophenyl) - 2 - methoxyethylamino - 7 - trifluoromethyl-3H - 1,4 - benzodiazepine 4 - oxide.

Substituting o - bromophenylmagnesium iodide for the m - fluorophenylmagnesium bromide above in equivalent amounts gives the 2 - bromophenyl congeners.

*Example 12*

2 - bromo - 3 - trifluoromethylbenzonitrile (prepared as in Example 10) is condensed with an excess of phenethylmagnesium bromide in ether solution to give, after treating with cold dilute hydrochloric acid, 2 - bromo - 3 - trifluoromethylphenyl phenethyl ketone imine hydrochloride. When this imine salt is heated with boiling water for one hour, 2 - bromo - 3 - trifluoromethylphenyl phenethyl ketone is obtained.

A mixture of 2.5 g. of 2 - bromo - 3 - trifluoromethylphenyl phenethyl ketone and 25 ml. of ammonia is heated at 140° C. for eight hours and the resulting 2-amino - 3 - trifluoromethylphenyl phenethyl ketone imine is hydrolyzed by heating with dilute hydrochloric acid, cooling and filtering to give 2 - amino - 3 - trifluoromethylphenyl phenethyl ketone.

By the procedure of Example 6 this ketone is converted to its oxime, then is treated with chloroacetyl chloride and acetic acid at room temperature to give 2-chloromethyl - 4 - phenethyl - 8 - trifluoromethylquinazoline 3 - oxide.

A solution of 2.5 g. of this quinazoline, and 5 ml. of allylamine in 25 ml. of methanol is left at room temperature for 36 hours. Filtration and recrystallization from methanol gives 2 - allylamino - 5 - phenethyl - 9 - trifluoromethyl - 3H - 1,4 - benzodiazepine 4 - oxide.

*Example 13*

2 - pyrrolylmagnesium iodide is condensed with 2-bromo - 5 - trifluoromethylbenzonitrile in ether solution to give, after treating with hydrochloric acid, the hydrochloride salt of 2 - bromo - 5 - trifluoromethylphenyl 2-pyrrolyl ketone imine.

This imine salt is heated with boiling water to give 2-bromo - 5 - trifluoromethylphenyl 2 - pyrrolyl ketone.

A mixture of 6.0 g. of 2 - bromo - 5 - trifluoromethylphenyl 2 - pyrrolyl ketone and 60 ml. of liquid ammonia is heated at 140° C. for eight hours. The resulting amino imine is hydrolyzed by heating with dilute hydrochloric acid to give 2 - amino - 5 - trifluoromethylphenyl 2-pyrrolyl ketone.

This ketone is converted to its oxime and then cyclized by treating with chloroacetyl chloride in acetic acid solution to give 2 - chloromethyl - 4 - (2 - pyrrolyl) - 6-trifluoromethylquinazoline 3 - oxide.

A mixture of 8.0 g. of the above prepared quinazoline and 30 ml. of 30% ethanolic ethylamine is stirred for 12 hours at 25–28° C. Filtration and recrystallization of the precipitate from ethanol gives 2-ethylamino-5-(2-pyrrolyl) - 7 - trifluoromethyl - 3 - H-1,4-benzodiazepine 4-oxide.

*Example 14*

An ether solution of 2-furylmagnesium bromide is added to 2-bromo-5-trifluoromethylbenzonitrile. The reaction mixture is poured into hydrochloric acid to separate the hydrochloride of 2-bromo-5-trifluoromethylphenyl 2-furyl ketone imine.

The imine salt is heated with boiling water for one hour to give 2-bromo-5-trifluoromethylphenyl 2-furyl ketone.

A mixture of 4.0 g. of the above prepared ketone and 40 ml. of liquid ammonia is heated at 145° C. for six hours. The excess ammonia is removed and the residue is dissolved in dilute hydrochloric acid. Basification gives 2 - amino - 5 - trifluoromethylphenyl 2-furyl ketone imine.

This imine is hydrolyzed by heating in a slight excess of dilute hydrochloric acid for one hour at 95–100° C. Cooling and filtering gives 2-amino-5-trifluoromethylphenyl 2-furyl ketone.

Refluxing this ketone with hydroxylamine hydrochloride, pyridine and ethanol gives the corresponding oxime.

Chloroacetyl chloride (6.0 g.), 2-amino-5-trifluoromethylphenyl 2-furyl ketone oxime (13.5 g.) and 100 ml. of acetic acid are mixed at 60° C., then allowed to stand at room temperature for 24 hours. Filtering yields 2 - chloromethyl-4-(2-furyl)-6-trifluoromethylquinazoline 3-oxide.

This quinazoline is mixed with an excess of cold 30% methanolic methylamine. After standing for 16 hours, the mixture is filtered to give 5-(2-furyl)-2-methylamino-7-trifluoromethyl-3H-1,4-benzodiazepine 4-oxide.

Substituting 3-furylmagnesium iodide for the 2-furylmagnesium bromide in the process described above the 3-furyl-keto and benzodiazepine oxide isomers are obtained.

*Example 15*

An ether solution of 7.5 g. of 2-bromo-5-trifluoromethylbenzonitrile is treated with 12.0 g. of 3-indolylmagnesium iodide. After stirring for two hours, the reaction mixture is poured into cold dilute hydrochloric acid to give the hydrochloride salt of 2-bromo-5-trifluoromethylphenyl 3-indolyl ketone imine.

Heating this imine salt with boiling water gives 2-bromo-5-trifluoromethylphenyl 3-indolyl ketone.

A mixture of the above prepared ketone and an excess of liquid ammonia is heated at 140° C. for eight hours. The resulting 2-amino-5-trifluoromethylphenyl 3-indolyl ketone imine is hydrolyzed by heating with dilute hydrochloric acid to give the desired product 2-amino-5-trifluoromethylphenyl 3-indolyl ketone.

A mixture of 15.2 g. of the above prepared ketone, 15.0 g. of hydroxylamine hydrochloride, 100 ml. of ethanol and 25 ml. of pyridine is refluxed for 10 hours. The mixture is cooled, concentrated, diluted with water and ether and filtered to give 2-amino-5-trifluoromethylphenyl 3-indolyl ketone oxime.

Treating this oxime with 6.0 g. of chloroacetyl chloride and 50 ml. of acetic acid for 48 hours at room temperature gives 2-chloromethyl - 4 - (3-indolyl)-6-trifluoromethylquinazoline 3-oxide.

This quinazoline is mixed with 100 ml. of ice cold methanolic methylamine. After standing for 16 hours at room temperature, the mixture is filtered to give 5 - (3 - indolyl) - 2 - methylamino-7-trifluoromethyl-3H-1,4-benzodiazepine 4-oxide.

Substituting equivalent quantities of 2- or 5-indolylmagnesium bromide for the 3-indolylmagnesium iodide in the reaction sequence above gives the corresponding isomers in the ketone and benzodiazepine oxide series.

What is claimed is:

The method of preparing trifluoromethyl-o-aminophenyl ketones having the following formula:

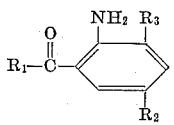

in which:

$R_1$ is a member selected from the group consisting of phenyl, fluorophenyl, chlorophenyl, bromophenyl, trifluoromethylphenyl, lower alkoxyphenyl, lower alkylphenyl, lower alkyl, cyclopentyl, cyclohexyl, benzyl, phenethyl, thienyl, pyrrolyl, pyridyl, furyl and indolyl; and $R_2$ and $R_3$ are members selected from the group consisting of hydrogen and trifluoromethyl, at least one of said members being trifluoromethyl which comprises treating a trifluoromethyl-o-halophenyl ketone having the following formula:

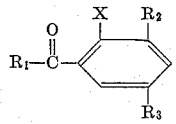

in which X is halogen and $R_1$, $R_2$ and $R_3$ are as defined above with ammonia at about 135–170° C. for about 6–15 hours to form a trifluoromethyl-o-aminophenyl ketone imine having the following formula:

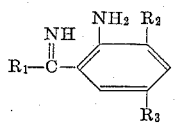

in which $R_1$, $R_2$ and $R_3$ are as defined above and hydrolyzing said trifluoromethyl-o-aminophenyl ketone imine.

References Cited by the Examiner

UNITED STATES PATENTS

| | | | |
|---|---|---|---|
| 1,946,058 | 2/1934 | Britton et al. | 260—570 |
| 2,711,428 | 6/1955 | Goodson et al. | 260—570.5 |
| 2,835,676 | 5/1958 | Sprague et al. | 260—570 X |
| 2,893,992 | 7/1959 | Sternbach | 260—239 |
| 3,007,934 | 11/1961 | Bencze | 260—296 |
| 3,109,843 | 11/1963 | Reeder et al. | 260—570 X |
| 3,120,521 | 2/1964 | Sternbach et al. | 260—239 X |
| 3,121,114 | 2/1964 | Keller et al. | 260—570 X |

OTHER REFERENCES

Saucy et al., "Helv. Chim. Acta," vol. 45, No. 6, pp. 2226–41 (1962).

Yale, "Journal of Medicinal and Pharmaceutical Chemistry," vol. 1, No. 2, pages 121-33 (1959).

CHARLES B. PARKER, *Primary Examiner.*

ROBERT V. HINES, *Assistant Examiner.*